(12) United States Patent
Magal et al.

(10) Patent No.: US 6,933,745 B2
(45) Date of Patent: Aug. 23, 2005

(54) BUS NETWORK INTERFACE

(75) Inventors: Eliezer Magal, Tel-Aviv (IL); Zeev Oster, Modiin (IL)

(73) Assignee: Spediant Systems Ltd., Tel Aviv (IL)

( * ) Notice: Subject to any disclaimer, the term of this patent is extended or adjusted under 35 U.S.C. 154(b) by 75 days.

(21) Appl. No.: 10/649,819

(22) Filed: Aug. 28, 2003

(65) Prior Publication Data

US 2005/0062499 A1 Mar. 24, 2005

(51) Int. Cl.$^7$ ............................................. H03K 19/003
(52) U.S. Cl. ............................ 326/21; 326/14; 327/20
(58) Field of Search ............................. 326/86, 14, 21, 326/90; 327/18–20

(56) References Cited

U.S. PATENT DOCUMENTS

| 6,211,694 | B1 | * | 4/2001 | Kamiya | .................. | 326/26 |
| 6,411,122 | B1 | * | 6/2002 | Mughal et al. | ............... | 326/30 |
| 6,822,480 | B1 | * | 11/2004 | McCalmont | ................. | 326/81 |

OTHER PUBLICATIONS

Chapter 22 "Reconciliation Sublayer (RS) and Media Independent Interface (MII)" in the IEEE 802.3 standard "Carrier sense multiple access with collision detection (CSMA/CD) access method and physical layer specifications", 2000, no month.

* cited by examiner

Primary Examiner—James H. Cho
(74) Attorney, Agent, or Firm—Mark M. Friedman

(57) ABSTRACT

A system and method for transmitting data includes one or more transmitters connected to each of at least one bus data line via open-driver bus data line drivers, and one or more receivers. In a preferred embodiment, the devices are interconnected by a parallel interface using a bus architecture having the bus data and carrier-sense (CRS) lines each driven by open-collector or open-drain drivers in a wired-and configuration. Pullup resistors and a common clock signal are also provided. Each device is provided with an interfacing unit which connects the device to the bus, and detects collisions by comparing data transmitted by the device with data received from the bus. The invention is particularly applicable to implementation as a backplane connecting intercommunicating printed wiring boards having interfaces such as the IEEE 802.3 (Ethernet) Media Independent Interface (MII), the interfacing unit serving to emulate the Ethernet PHY.

25 Claims, 4 Drawing Sheets

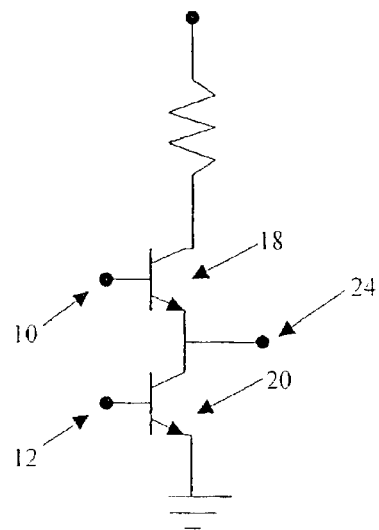
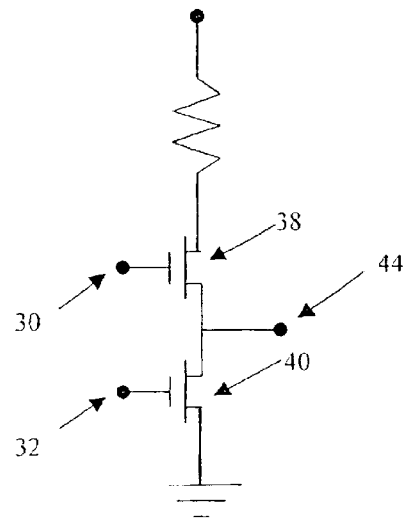
Figure 1
(prior art)
Figure 2
(prior art)
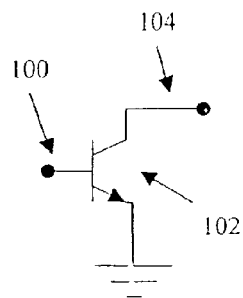
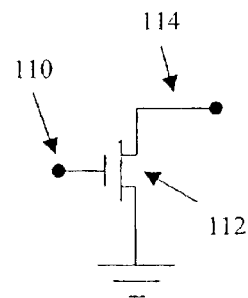
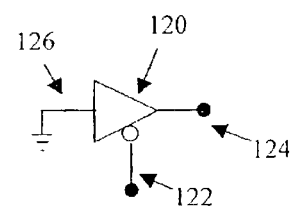
Figure 3
(prior art)
Figure 4
(prior art)
Figure 5
(prior art)

BUS NETWORK INTERFACE

FIELD AND BACKGROUND OF THE INVENTION

The present invention relates to a network interface system having a bus architecture: and more particularly to a system that facilitates the transfer of data among a collection of devices via a common bus without the need for connecting each device separately to a central unit.

In a bus architecture, all of the devices on the network communicate via a common set of data lines. This is in contrast to some other network architectures wherein each device is connected to a hub or switch via an individual connection.

The MII (Media-Independent Interface) is a standard interface specified in IEEE Standard 802.3, The Institute of Electrical and Electronics Engineers, New York, N.Y., 2000, which is incorporated by reference for all purposes as if fully set forth herein. The MII provides specifications for the connection of the Ethernet MAC (Media Access Control) layer to the Ethernet Physical (PHY) layer. The MII is incorporated in many devices, such as CPU's and network processors. The MII is intended to connect a single MAC to a network cable leading to a port on a device such as a hub or switch. Although the Ethernet transmits data serially, the MII transmits data in parallel. In an Ethernet network, the MII is connected to a PHY interface, which handles, among other things, the interconversion of serial and parallel data. Over short distances, parallel data transmission is advantageous because it allows the use of slower, cheaper electronic components, although it does require more data paths, and is subject to data timing problems, both of which problems are of only minor significance for short-distance data transmission.

It is often desirable to connect several devices in a private network in a limited space where cost and reliability are primary considerations, while the ability to support connections of more than approximately one meter is unimportant. This is particularly the case when it is desired to interconnect several printed-circuit cards within a single chassis, by means of a printed-circuit backplane, in which case all of the communicating devices are in very close proximity to each other typically less than one meter. In such a situation, especially where the communicating devices incorporate MII interfaces, it is often desirable to use parallel data transmission rather than incur the expense of a full serial Ethernet system, with a full PHY interface for each device on the network.

Connecting multiple devices via a bus presents a problem because more than one device may try to drive the bus at the same time. This is especially troublesome if the driving devices include active pullup. FIG. 1 and FIG. 2 illustrate prior-art output drivers having active pullup. Drivers such as these are often referred to as "totem-pole" outputs. FIG. 1 illustrates a bipolar-transistor active-pullup output driver. FIG. 2 illustrates a field-effect-transistor (FET) active-pullup output driver.

Active pullup devices effectively connect the driven line to either a high or low logic level. In the bipolar active-pullup output driver of FIG. 1, output 24 is driven to a low logic level when driving circuitry (omitted here for simplicity) connected to base 10 of transistor 18 and base 12 of transistor 20, cuts off current to the base 10 of transistor 18, making transistor 18 non-conductive, and drives current into the base 12 of transistor 20, making transistor 20 conductive. In contrast, output 24 is driven to a high logic level when current is driven into the base 10 of transistor 18, making transistor 18 conductive, and current to the base 12 of transistor 20 is cut off, making transistor 20 non-conductive.

Similarly, in the FET active-pullup output driver of FIG. 2, output 44 is driven to a low logic level when driving circuitry (omitted here for simplicity) connected to gate 30 of FET 38 and gate 32 of FET 40, places a high voltage oil gate 30 of p-channel FET 38, making FET 38 non-conductive, and places a high voltage on gate 32 of n-channel FET 40, making FET 40 conductive. In contrast, output 44 is driven to a high logic level when a low voltage is placed on gate 30 of p-channel FET 38, making FET 38 conductive, and a low voltage is placed on gate 32 of n-channel FET 40, making FET 40 non-conductive.

Direct connection of the outputs of two or more active-pullup devices is considered poor practice in the art, because, in a situation where one device attempts to drive a high logic level and another device attempts to drive a low logic level, the resulting logic level is indeterminate, and large Currents flowing through the switching devices may damage the switching devices or other components of the system.

As used herein, unless otherwise specified, the term "open-driver" refers to a device, without active pullup, for driving a logic signal. The tern "open-driver" derives from the term "open-collector", which, in turn, derives from bipolar transistor technology. Open-driver, as used herein, is a more general term than open-collector, referring not only to open-collector topologies, but also to similar topologies, such as open-drain, implemented in other technologies, such as FET technology.

In a typical application, an open-driver device drives a low logic level on its output by connecting the output, via a switching device such as a bipolar transistor or FET, to a low logic level, such as ground. When an open-driver device is not driving a low logic level on its output the output of the open-driver device is in a high-impedance state, i.e., the switching, device is made to stop conducting, allowing the output to reach a logic level determined by whatever other devices are connected to the output. Typically, at least one resistor, known as a pullup resistor, is connected from the output to a high logic level, such as the power supply, so that the output line is at a high logic level whenever all open-driver devices connected to the line are in a non-conducting state.

FIG. 3 illustrates schematically a bipolar-transistor open-collector driver. In this version of an open-driver driver, a low logic level is driven on output 104 by allowing current to flow into base 100 of transistor 102; causing transistor 102 to become conductive and effectively connect output 104 to ground. If current flowing through base 100 is insufficient to make transistor 102 conductive, the driver is said to be in a high-impedance state, and the potential of output 104 is determined by whatever other circuitry, not shown, is connected to output 104. Typically, such circuitry includes at least one pullup resistor.

FIG. 4 illustrates schematically an FFT open-drain driver. In this version of an open-driver driver, a low logic level is driven on output 114 by impressing a high logic level on gate 110 of n-channel FET 112, causing FET 112 to become conductive and effectively connect output 114 to ground. When the potential applied to gate 110 is insufficient to make FET 112 conductive, the driver is said to be in a high-impedance state, and the potential of output 114 is determined by whatever other circuitry, not shown, is connected to output 114. Typically, such circuitry includes at least one pullup resistor.

An alternative configuration for an open-driver driver utilizes a device having a three-state output. A three-state device is able to, alternatively, drive its output to a low logic level, drive its output to a high logic level, or place its output in a high-impedance state. In the high-impedance state, the three-state driver is effectively disconnected from its output line, allowing the output line to be driven by other, similar devices connected to the output line. When in the high-impedance state, a three-state driver is said to be "disabled", and when not in the high-impedance state, a three-state driver is said to be "enabled". An example, illustrated schematically in FIG. 5, of a three-state driver configured as an open-driver driver uses a three-state buffer 120 with an inverting three-state control input 122. If three-state-control input 122 is at a low logic level, output 124 of buffer 120 follows input 126 of buffer 120. If three-state-control input 122 is at a high logic level, output 124 of buffer 120 is in a high-impedance state. Because input 126 of buffer 120 is set to a low logic level by being connected to ground, a low logic level applied to three-state-control input 122 causes a low logic level to be driven on output 124 of buffer 120. A high logic level applied to the three-state-control input 122 causes output 124 of buffer 120 to be in a high-impedance state. With appropriate pullup, not shown, output 124 will be at a high logic level if output 124 of buffer 120 is in a high-impedance state. Thus, the configuration of FIG. 5 effectively performs as an open-driver driver. This configuration is particularly useful where ordinary open-driver outputs are not available, but three-state outputs are available, or where parts of a system have spare three-state drivers.

As used herein, the term "wired-and" refers to the connection in common of open-driver outputs such that the logic level of the common connection is low if any one or more of the open-driver outputs is driving a low logic level. Note that, in the degenerate case of a single open-driver output, the configuration can still be referred to as a wired-and, because the single output is low if the single open-driver output is driving a low logic level.

FIG. 6 illustrates schematically, by way of example only, an FET wired-and configuration, although it will be appreciated that the concepts discussed apply to wired-and configurations incorporating other types of open-driver drivers.

According to accepted practice in the art, the common connection 130 of wired-and connected open-driver outputs 132 is further connected, by means of a resistor 134, known as a pullup resistor 134, to a conductor 136 at a high logic level. A wire-and connection without a pullup resistor 134 may operate, but is likely to be slow and unreliable, and thus neglecting to include a pullup resistor 134 is considered poor practice in the art.

If several open-driver outputs 132 are wired together and a pullup resistor 134 is included, and none of the FETs 138 is in a conductive state pullup resistor 134 effectively connects common connection 130 to conductor 136, causing common connection 130 to be at a potential near the potential of conductor 136, and this potential is referred to herein as the default logic state of the common connection 130, or, more simply, the default. If one or more of the FETs 138 is in a conductive state, the potential of the common connection 130 follows that of the open-driver outputs 132 of the conductive FETs 138, and this potential is referred to herein as the driven potential.

Common Ethernet local area networks (LAN's), such as 100BaseT, are usually configured in a "star" architecture, with each device on the network connected via its own four-wire cable to a central unit, such as a hub or switch. Because each device must have its own four-wire connection to the central unit, implementing such an interface on a printed-circuit backplane requires 4N traces, where N is the number of devices. Thus, a system with twenty printed circuit cards communicating via a network implemented on a single, common backplane would require 80 circuit traces. A bus architecture where all of the devices communicate via a small number of shared circuit traces driven by open-driver drivers makes the design of the backplane much simpler, because each device need only connect to a small number of shared circuit traces. Many devices are equipped with a parallel-format MII interface, and it is desirable to eliminate the cost of also including an Ethernet PHY interface. In a star architecture, the reliability of the central unit is critical. If the central unit fails or is absent, the entire network is not usable. In a bus architecture, there is no central unit to fail.

There is thus a widely recognized need for, and it would be highly advantageous to have, a system for allowing a group of devices located in close proximity to each other to communicate with each other via a bus architecture. Optionally, the communication bus would provide parallel data paths. Preferably, the communication bus would allow the devices to communicate with each other through an interface that appears to each device as would an MII interface, but without the expense and complication of a full Ethernet implementation.

SUMMARY OF THE INVENTION

The MII interface includes sixteen signals, not including ground lines However, many of the MII signals can be combined, eliminated or ignored in a short-range bus-architecture network, yielding a simple, robust network at relatively low cost.

Therefore, according to the present invention there is provided a system for transmitting data, the system including: (a) at least one bus data line; and (b) at least one transmitter, each transmitter including: (i) for each bus data line, a respective open-driver bus data line driver, each open-driver bus data line driver drivingly connected to a corresponding bus data line.

Preferably, the transmitter further includes: (ii) at least one transmit data line for driving a respective open-driver bus data line driver.

Preferably, the transmitter further includes: (iii) at least one active-pullup driver drivingly connected to a respective open-driver bus data line driver.

Preferably, the transmitter further includes: (iii) a collision-detection mechanism operative to detect a data difference between one or more of the transmit data lines and corresponding bus data lines, and to set a collision signal upon detecting a data difference.

Preferably, in the system, the collision signal being set causes the open-driver bus data line driver to drive its respective bus data line with data selected to cause any transmitter that is transmitting data to the bus data lines to detect a collision.

Alternatively, in the system, the collision signal being set causes the open-driver bus data line driver to drive its respective bus data line to a low logic level.

Preferably, the system further includes: (c) a clock signal line, operative to transmit a clock signal, the clock signal operative to restrict setting of the collision signal only according to data on the transmit data lines and the bus data lines during a predetermined range of times within a period of the clock signal.

Preferably, the system further includes: (c) a data-sense signal line operative to conduct a data-sense signal.

Preferably, in the system, the data-sense signal has a driven state, and each transmitter further includes: (iv) an open-driver data-sense signal line driver operative to drive the data-sense signal line to the data-sense signal's driven state when the transmitter is transmitting data.

Preferably, in the system, the open-driver data-sense signal line drivers of the transmitters are connected in a wired-and configuration.

Preferably, the system further includes: (d) a conductor at a high logic level; and (e) a resistor, the resistor being connected between the conductor and the data-sense signal line.

Preferably, the data-sense signal has a default state, and the transmitter further includes: (iv) a latch operative, if the collision signal is set, to keep the collision signal set until the data-sense signal is in the data-sense signal's default state.

Preferably, in the system, the transmitter further includes: (ii) a data-valid signal line, operative to transmit a data-valid signal, each open-driver bus data line driver of the transmitter being operative to be in a high-impedance state when the data-valid signal is in an inactive state and the collision signal is cleared.

Preferably, the system further includes: (c) a data-sense line operative to conduct a data-sense signal.

Preferably, the data-sense signal has a driven state and each transmitter further includes: (iv) an open-driver data-sense signal line driver operative to drive the data-sense signal line to the data-sense signal's driven state when the transmitter is transmitting data.

Preferably, the open-driver data-sense signal line drivers of the transmitters are connected in a wired-and configuration.

Preferably, the system further includes: (d) a conductor at a high logic level; and (e) a resistor, the resistor being connected between the conductor and the data-sense signal line.

Preferably, the system further includes: (c) a conductor at a high logic level; and (d) a resistor, the resistor being connected between the conductor and one bus data line.

Preferably, the system further includes: (c) a clock signal line, operative to transmit a clock signal to the transmitter.

Preferably, the system further includes: (c) a receiver operative to receive data from the bus data lines.

Preferably, the system further includes: (d) a clock signal line, operative to transmit a clock signal to the receiver Preferably, in the system, the transmitter further includes: (ii) a data-valid signal line, operative to transmit a data-valid signal, each open-driver bus data line driver of the transmitter being operative to be in a high-impedance state when the data-valid signal is in an inactive state.

Preferably, corresponding open-driver bus data line drivers connected to a corresponding bus data line are connected in a wired-and configuration.

According to the present invention, there is further provided a system to connect a device to a bus, the device having a transmitter and a receiver, the bus having a plurality of bus data lines, the bus being operative to be connected to other transmitters and to other receivers, the system including: (a) for each of the bus data lines, a respective open-driver bus data line driver suitable to be drivingly connected to the bus data line.

Preferably, the system further includes: (b) at least one transmit data line operative to accept data from the transmitter of the device and to drive a respective open-driver bus data line driver.

Preferably, the system further includes: (c) a collision-detection mechanism operative to detect a data difference between one of the transmit data lines and the corresponding bus data line, and to set a collision signal upon detecting a data difference.

Preferably, the collision signal being set causes at least one of the plurality of open-driver bus data line drivers to drive its respective bus data line with data selected to cause any transmitter that is transmitting data to the bus data lines to detect a collision.

Alternatively, the collision signal being set causes at least one of the plurality of open-driver bus data line drivers to drive its respective bus data line to a low logic level.

Preferably, the system further includes: (d) a clock signal line, operative to transmit a clock signal, the clock signal operative to restrict setting of the collision signal only according to data on the transmit data lines and the bus data lines during a predetermined range of times within a period of the clock signal.

Preferably, the system further includes: (d) an open-driver data-sense signal line driver operative to drive a data-sense signal line of the bus to a driven state when the transmitter of the device is transmitting data.

Preferably, the system further includes: (d) a conductor at a high logic level; and (e) a resistor, the resistor being connected between the conductor and the data-sense signal line.

Preferably, the system further includes: (d) a latch operative, if the collision signal is set, to keep the collision signal set until the data-sense signal line is in a default state.

Preferably, the system further includes: (d) a data-valid signal line, operative to accept a data-valid signal, each open-driver bus data line driver of the system being operative to be in a high-impedance state when the data-valid signal is in an inactive state and the collision signal is cleared.

Preferably, the system further includes: (b) a conductor at a high logic level; and (c) a resistor, the resistor being connected between the conductor and one bus data line, the conductor and the resistor operative to cause the one bus data line to be at a high logic level when all the bus data line drivers connected to the one bus data line are in a high-impedance state.

Preferably, the system further includes: (b) a clock signal line, operative to transmit a clock signal to the transmitter of the device and to the receiver of the device, the clock signal operative to synchronize transmission of data by the transmitter to the bus data lines, and the clock signal operative to synchronize reception of data by the receiver from the bus data lines.

Preferably, the system further includes: (b) a gate; and (c) a data-valid signal line, operative to accept a data-valid signal, the gate operative to cause an open-driver bus data line driver of the system to be in a high-impedance state when the data-valid signal is in an inactive state.

According to the present invention, there is provided a method of transmitting data, via at least one bus data line, from a transmitter to a receiver, the transmitter having as many transmit data lines as there are bus data lines, including the steps of: (a) providing an open-driver bus data line driver; and (b) transmitting data from the transmitter to the receiver via the transmit data line, the open-driver bus data line driver, and the bus data line.

Preferably, the method further includes the step of: (c) monitoring the transmit data line and the bus data line for a data difference.

Preferably, the method further includes the step of: (d) upon detection of the data difference, retransmitting the data.

Preferably, the method further includes the step of: (d) upon detection of the data difference, transmitting data selected to cause any transmitter that is transmitting data to the bus data lines to detect a collision, until no transmitters connected to the bus data line are transmitting data.

Preferably, the method further includes the step of: (d) upon detection of the data difference, transmitting a low logic level on the bus data line until no transmitters connected to the bus data line are transmitting data.

BRIEF DESCRIPTION OF THE DRAWINGS

The invention is herein described, by way of example only, with reference to the accompanying drawings, wherein:

FIG. 1 (prior art) illustrates schematically a bipolar-transistor active-pullup output driver;

FIG. 2 (prior art) illustrates schematically an FET active-pullup output driver;

FIG. 3 (prior art) illustrates schematically a bipolar-transistor open-driver (open-collector) output driver;

FIG. 4 (prior art) illustrates schematically an FET open-driver (open-drain) output driver;

FIG. 5 (prior art) illustrates schematically a three-state buffer implementation of an open-driver driver.

DESCRIPTION OF THE PREFERRED EMBODIMENTS

The present invention is of a network interface system having a bus architecture, and more particularly a system that facilitates the transfer of data among a collection of devices via a common bus without the need for connecting each device via a separate set of lines to a central unit.

The discussion below, by way of example only, shows how the present invention ma)y be applied to the connection of devices having MII interfaces via a bus architecture having a four-line parallel data path. However, the principles discussed apply to devices with interfaces other than MII, and to data paths having any number of lines, including a data path consisting of a single line. All such applications are included in the scope of the present invention.

The principles and operation of a network interface according to the present invention may be better understood with reference to the drawings and the accompanying description.

Figure 7:
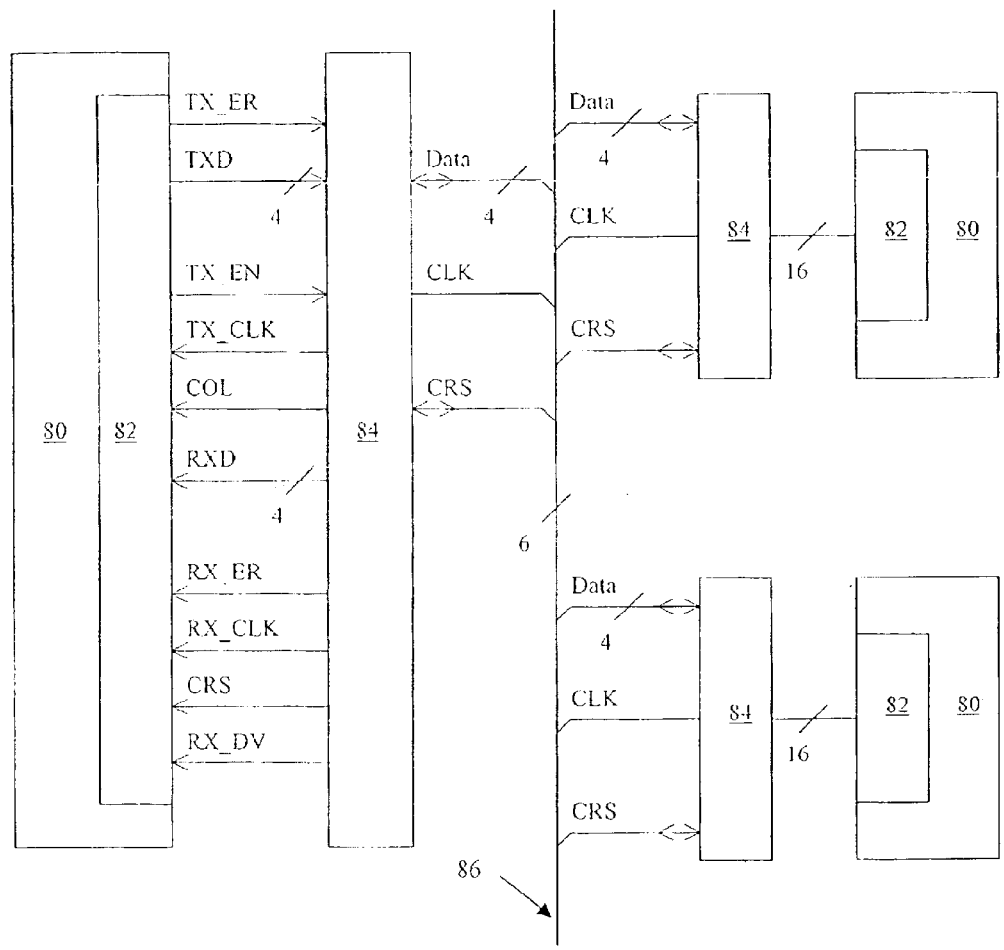
FIG. 7 illustrates schematically in network according to the present invention.

Referring now to the drawings, FIG. 7 illustrates schematically a preferred embodiment of a bus-architecture network according to the present invention. A mechanism is provided for connecting a group of devices 80, each device 80 having a Media Access Control (MAC) unit 82 having an MII interface. For simplicity, only the MII interface on the left is shown in detail in FIG. 7. Each MAC 82 is connected, via an MII interface, to a "PHY emulator" 84, which emulates an Ethernet PHY, tile PHY emulators 84 being connected to each other via a bus 86, such that each device 80 may communicate with any other device 80 using the same protocols as would be used if the devices 80 were connected via Ethernet. PHY emulator 84 is described in more detail below.

In a prior-art Ethernet network, a device, having a MAC with an MII interface, that needs to transmit data waits until the CRS (carrier sense) line is low. If CRS is low, the device sets the signal TX_EN high, transmits its data, and, if the transmission is successful, the network becomes available for other devices to transmit their data. If the transmission is not successful, such as may occur in a situation known as a "collision", wherein two devices attempt to transmit at substantially the same time, each device that attempted transmission must receive a high logic level on the COL line of its MII, which causes the transmitting devices to abandon their transmission attempts and to wait pseudo-random amounts of time before attempting to retransmit their data. This pseudo-random wait helps to ensure that the device with the shorter wait will be able to seize control of the network soon enough that the other device will be able to sense that the network is not available, and thus not attempt to transmit until the device with the shorter wait has completed its transmission, preventing another collision.

The system of the present invention connects multiple devices 80 via a bus 86 in such a way as to emulate this above-described Ethernet behavior.

For clarity, MII signals, when referenced herein, have the prefix "MII". Bus signals have the prefix "B".

Figure 8:
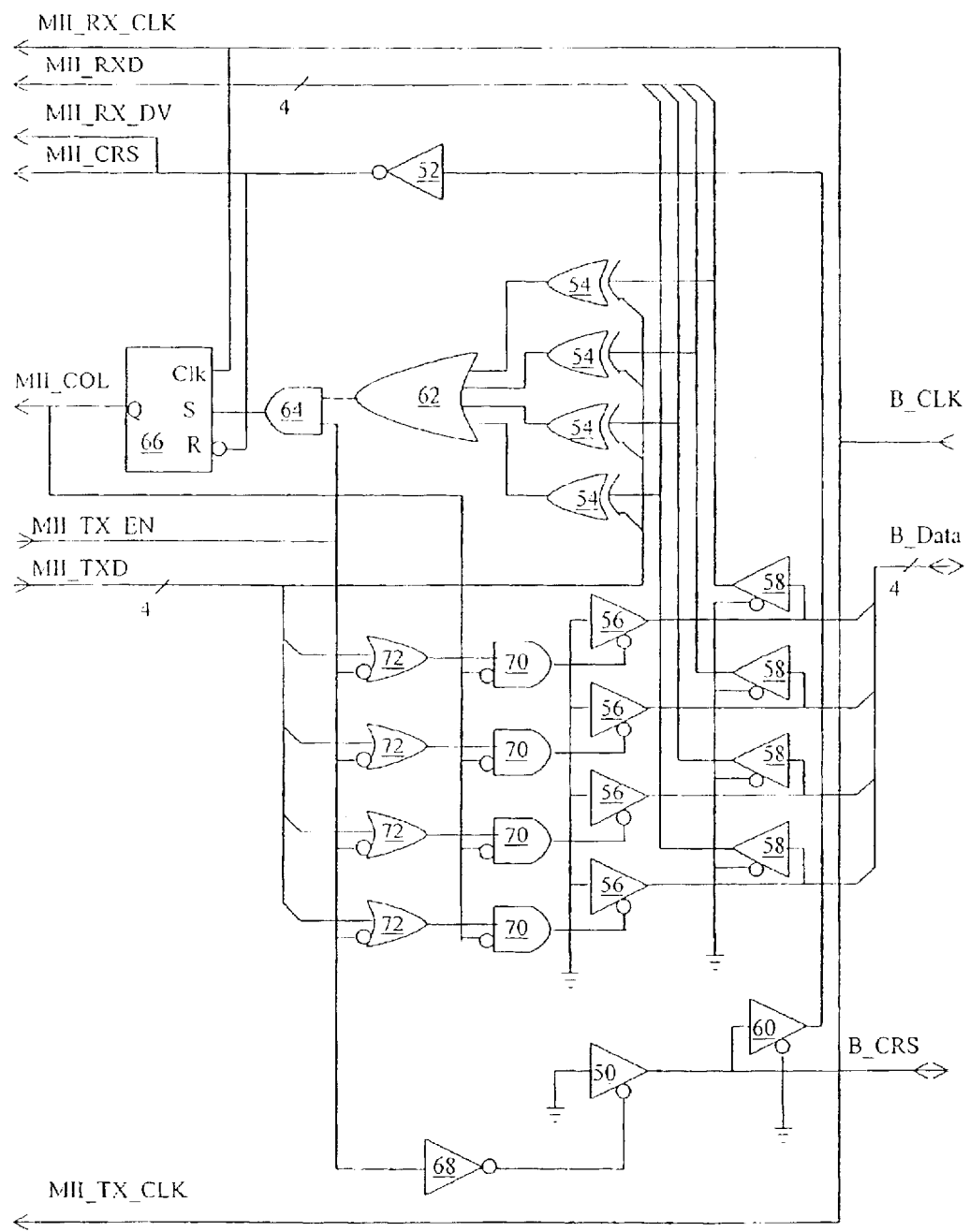
FIG. 8 illustrates schematically a system (PHY emulator) for connecting a MAC device to a bus network according to the present invention.

FIG. 8 illustrates schematically a preferred embodiment of a PHY emulator 84 according to the present invention.

Figure 6:
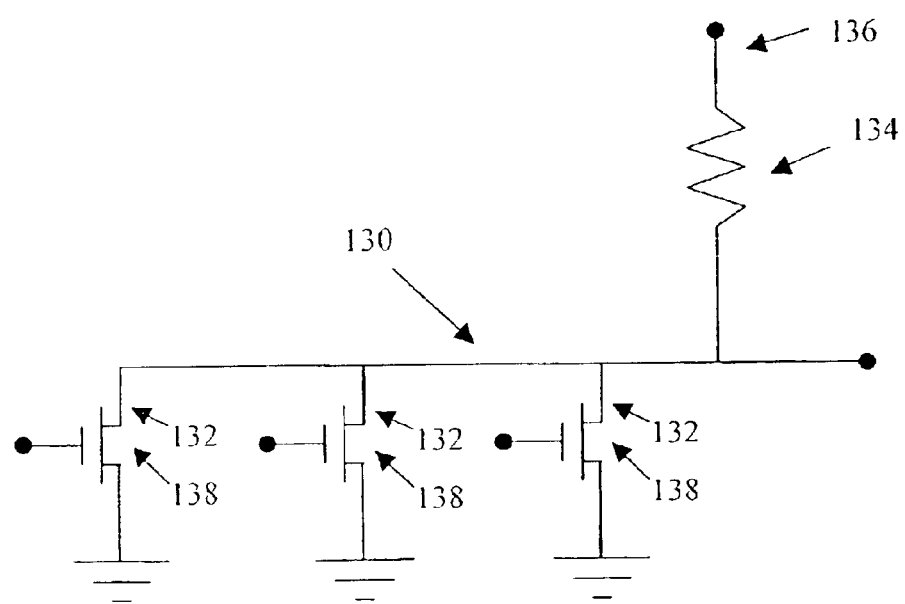
FIG. 6 (prior art) illustrates schematically several FET open-driver outputs connected in a wired-and configuration.

The B_CRS (bus carrier-sense) line is an active-low signal. It is driven by open-driver buffer 50 continued within the PHY emulator units 84. The outputs of the open-driver CRS buffers 50 of all of the PHY emulator units 84 communicating via bus 84 are connected together in a wired-and configuration (see FIG. 6), each open-driver buffer 50 being driven by the logical inverse of the MII_TX_EN output of the corresponding MAC 82. The logical inverse is used because MII_TX_EN is active-high, but B_CRS is active-low. The B_CRS signal acts as a data-sense signal, allowing devices 80 to detect if another device 80 is transmitting data.

The MII_RX_DV input signal and the MII_CRS input signal are driven by the B_CRS line, via an inverter 52. The inverse is used because B_CRS is active-low, and MII_RX_DV and MII_CRS are active-high. When the B_CRS signal is low, indicating that a device 80 is transmitting data, the MII_CRS signal of each device 80 is high, inhibiting other devices 80 from attempting to transmit data. When the B_CRS signal is high, indicating that no devices 80 are transmitting data, devices 80 needing to transmit data may attempt to transmit data.

The MII_RX_ER input signal is not used in this preferred embodiment, and this MAC input line is connected to ground to insure that it is always in the "low" logic state. For simplicity, this signal is not shown in FIG. 8.

The MII_TX_ER output signal is not used in this preferred embodiment. For simplicity, this signal is not shown in FIG. 8.

The four respective MII_RXD MAC parallel data input lines are driven by the four B_Data lines, correspondently, via respective buffers 58. The respective MII_RXD lines are also used as inputs to respective exclusive-or gates 54 included in PHY emulator 84 to facilitate detection of collisions, as described in detail below. Optionally, buffers 58 may be omitted, and the MII_RXD lines connected directly to respective B_Data lines, provided that omitting buffers 58 does not lead to unacceptable loading of the B_Data lines.

When the active-high MII_TX_EN output is active, any mismatch of logic levels between corresponding lines of MII_RXD and MII_TXD at the time of the rising edge of the B_CLK signal causes the active-high MII_COL input to be active until the B_CRS signal becomes inactive (high), as explained in detail below.

The four B_Data lines form the common data path between the several communicating devices 80. Respective B_Data lines are driven by respective open-driver buffers 56, included in PHY emulator units 84, in a wired-and configuration; if MII_COL is active (high), the inverting inputs of and-gates 70 are driven to a high logic level, which in turn causes the outputs of and-gates 70 to impress a low logic level on the inverting three-state control inputs of three-state buffers 56, causing three-state buffers 56 to drive a low logic level on all four B_Data lines. Forcing the B_Data lines to logic zero in this manner helps to insure that all devices 80 that were attempting to transmit at the time of a collision will detect a collision. If MII_COL is inactive and MII_TX_EN is active, the inverting inputs of or-gates 72 are at a high logic level, causing the respective output logic levels of respective or-gates 72 to be the same as respective MII_TXD values at the non-inverting inputs of respective or-gates 72. Inverting inputs of and-gates 70 being at a low logic level causes output logic levels of respective and-gates 70 to be the same as respective outputs of or-gates 72. If the output of a respective and-gate 70 is at a high logic level, the output of the corresponding buffer 56 will be in a high-impedance state. If the corresponding B_Data line has an appropriate pullup resistance, and no other devices 80 are transmitting data on this B_Data line, this B_Data line will be at a high logic level. If the output of a respective and-gate 70 is at a low logic level, the output of the corresponding buffer 56, and the corresponding B_Data line, will be at a low logic level. Thus, if MII_COL is inactive and MII_TX_EN is active, the respective logic levels of the respective MII_TXD outputs are driven on the respective B_Data lines via open-driver drivers 56.

If MII_COL is inactive and MII_TX_EN is inactive, the inverting inputs of or-gates 72 are at a low logic level, causing the output logic levels of or-gates 72 to be at a high logic level. Inverting inputs of and-gates 70 being at a low logic level causes output logic levels of respective and-gates 70 to be the same as respective outputs of or-gates 72, in this case a high logic level. If the output of a respective and-gate 70 is at a high logic level, the output of the corresponding buffer 56 will be in a high-impedance state. Thus, if MII_COL is inactive and MII_TX_EN is inactive, data line drivers 56 will not interfere with data being transmitted on the wired-and B_Data lines by other devices 80 on the network.

Returning now to the detection of collisions, exclusive-or gates 54 respectively compare data on corresponding lines of MII_TXD and MII_RXD. Each respective exclusive-or gate 54 has an output of a low logic level if both inputs of that respective exclusive-or gate 54 are at the same logic level as each other. Each respective exclusive-or gate 54 has an output of a high logic level if the two inputs of that exclusive-or gate 54 are at logic levels that differ from each other.

The inputs of or-gate 62 are the outputs of exclusive-or gates 54. The inputs of and-gate 64 are the output of or-gate 62 and the signal MII_TX_EN. Thus, if MII_TX_EN is at a high logic level, indicating that device 80 is transmitting data, and if the output of at least one of exclusive-or gates 54 is at a high logic level, indicating a mismatch between transmitted and received data, as may occur when more than one device 80 attempts to transmit data at the same time, the output of and-gate 64 will be high, indicating a collision. In the special case of a system with only a single data line rather than multiple parallel data lines, only a single exclusive-or gate 54 is needed, with the output of exclusive-or gate 54 connected directly to an input of and-gate 64, and or-gate 62 may be eliminated. Because there is a delay between the time that device 80 places data on MII_TXD and the time those data appear on MII_RXD, brief mismatches may occur between inputs of individual exclusive-or gates 54, causing the output of and-gate 64 to be at a high logic level for brief intervals even when no collision condition exists. To prevent such false collision conditions from disrupting operation of the system, and to ensure that true collisions are detected by all devices that attempted to transmit data at the time of a collision, an SR (set-reset) flip-flop 66, which changes state only at the time of a rising clock pulse, a time at which the inputs to exclusive-or gates 54 have stabilized, is included.

A difference between respective data on a respective transmit data line and respective data on a respective corresponding bus data line, such as may occur in a collision, is referred to herein as a "data difference".

As used herein, a logic signal in the "true" state is referred to as being "set".

As used herein, a logic signal in the "false" state is referred to as being "cleared".

For convenience, SR flip-flop 66 incorporates an inverted reset input, "R", which activates the reset function of SR flip-flop 66 when input R is at a low logic level rather than when input R is at a high logic level, as explained below. Alternatively, an SR flip-flop with a non-inverting reset input may be used, with the reset input driven by an inverter driven by inverter 52, or the reset input may be driven by the output of buffer 60. The "S" (set) input of SR flip-flop 66 is driven by the output of and-gate 64. The "R" (inverted-reset) input of SR flip-flop 66 is driven by the output of inverter 52. The input of inverter 52 is driven, via buffer 60, by the B_CRS signal. Output Q of SR flip-flop 66 drives the signal MII_COL. Output Q of SR flip-flop 66 changes logic level only at the time of the rising edge of the clock signal at the Clk (clock) input of SR flip-flop 66, as a function of the logic level of input S of SR flip-flop 66 and of the logic level of inverted-reset input R of SR flip-flop 66, in accordance with the following rules: If S is at a low logic level and R is at a high logic level, output Q remains at the same logic level that output Q had before the rising edge of Clk; if S is at a low logic level and R is also at a low logic level, output Q will be at a low logic level after the rising edge of Clk; If S is at a high logic level and R is also at a high logic level, output Q will be at a high logic level after the rising edge of Clk. In the circuit of FIG. 8, the situation of S being at a high logic level and R being at a low logic level does not occur, because S being at a high logic level requires that MII_TX_EN be at a high logic level; MII_TX_EN being at a high logic level causes the output of inverter 68 to be at a low logic level, enabling the output of tri-state buffer 50, in turn causing the output of buffer 60 to be at a low logic level, in turn causing the output of inverter 52 to be at a high logic level. Thus, because the output of inverter 52 is connected to R, R must be at a high logic level if S is at a high logic level. Therefore, the situation of S being at a high logic level and R being at a low logic level is irrelevant to the circuit of FIG. 8 ("don't-care condition").

Upon detecting a high logic level on the MII_COL signal line, device 80 aborts is transmission, setting MII_TX_EN to a low logic level. When all devices 80 have set their respective MII_TX_EN signals to a low logic level, their respective buffers 50 will be in a high-impedance state and the logic level of the B_CRS line will be high. This will in turn cause the output of their respective inverters 52 to be at a low logic level, causing their respective SR flip-flops 66 to reset their respective outputs Q to a low logic level, thus ending the collision condition and allowing respective devices 80 to attempt retransmission of their respective data after pseudo-random waits, as described above.

Reception of data signals transmitted as potentials or transitions of potentials requires that the receiver have information about the timing of the signals. There are many mechanisms well-known to the art for obtaining this timing information. A signal may be made to be self-clocking, in that the timing information may be derived from the signal itself. It is also possible to provide the timing information via a separate clock signal. The use of any mechanism for providing timing information to the receiver is included in the scope of the present invention.

The MII specifies that there be two separate clock signals, the MII_TX_CLK signal, which is an input to the MAC, and the MII_RX_CLK signal, which is also an input to the MAC. In ordinarily applications of the MAC using the MII, the MII_TX_CLK and MII_RX_CLK signals are supplied by the PHY interface. In this preferred embodiment of the present invention, the MII_TX_CLK and MII_RX_CLK signals are driven by the B_CLK line. The B_CLK line is driven by a mechanism selected from one of several discussed in detail below.

In the system of the present invention, the clock signal B_CLK may be supplied in any of various ways. One way is for there to be a dedicated clock module that drives the clock line. An alternative way is for one, and only one, of the devices 80 connected by the bus 86 to have a clock oscillator and associated driver to drive the clock line. Although having a single clock means that failure of that single clock causes failure of the entire system, a clock oscillator and associated driver is a much simpler system than a hub or repeater, and thus is much more reliable.

Alternatively, one or more of the devices 80 connected by the bus 86 can have a system that detects the presence of a clock signal. If a clock signal is present, the device 80 leaves its own clock output in a high-impedance state, so that the device 80 does not interfere with the existing clock signal. If no clock signal is detected, the device 80 generates a clock signal and drives the clock line with that signal. Because it is undesirable, and possibly damaging, for two clocks to try to drive the same clock line, a mechanism is included whereby the device 80 detects whether another device 80 is trying to drive the clock at the same time. Such detection may be performed by observing the signal on the clock line, and detecting any deviation of that signal from the signal transmitted by the clock of that device 80. If a deviation is detected, the device 80 sets its clock output to a high-impedance state. If, after setting the clock output to a high-impedance state, a valid clock signal is detected on the clock line, the device 80 may safely assume that another device is driving the clock line, and the device 80 does not send a clock signal. However, if, after waiting an amount of time chosen pseudo-randomly, no clock signal is detected, the device 80 again attempts to drive the clock line. The pseudo-random delay reduces the likelihood that two or more devices 80 will attempt to drive the clock line at substantially the same time.

It is preferable that the clock signal be driven by a driver with active pullup, such as a "totem-pole" driver, because an active pullup provides a sharper clock transition, although such a driver must be able to withstand the occasional brief overload when an attempt is made by more than one driver to drive the clock line to different potentials. However, it is possible to achieve satisfactory performance with drivers with passive pullup, including open-driver devices such as open-collector or open-drain drivers, and the use of any type of driver for the clock line is within the scope of the present invention.

The B_Data and B_CRS lines are all driven by devices with open-driver outputs. Thus, each of these lines must have a pullup resistance. The pullup resistance must be of a value within a restricted range, such that the pullup resistance is high enough to allow a single driver to drive a low signal, but the pullup resistance is low enough to quickly charge the line when all of the drivers attached to the line are in their non-conducting state.

Thus, there are many possible ways of configuring the pullup resistance. One configuration is to have a single pullup resistor for each line. This solution is very easy to implement if the data bus 86 is implemented on a printed wiring board, because it only requires one resistor for each B_Data line and a resistor for the B_CRS line. This solution is also advantageous because the total pullup resistance does not vary as a function of the number of devices connected to the bus 86, allowing a broad range of numbers of devices 80 to be connected to the bus 86.

Another pullup configurational is where one of the devices 80 has a pullup resistor for each line. This configuration is advantageous when the bus 86 is implemented as a cable, so that attaching resistors to the cable would be inconvenient. However, this solution requires that one of the devices 80 be of a design that differs slightly from that of other devices 80 due to the inclusion of the pullup resistor. Also, removal or failure of this one device 80 would leave the entire network without pullup.

A variation of the configuration wherein one device 80 has a pullup resistor is for two or more of the devices 80 to have pullup resistors. The pullup resistors may be chosen to have values such that adequate pullup is provided by a single resistor, but the parallel combination of the several resistors is of high enough resistance to allow a single driver to drive the line to a low logic level. Thus, removal of any individual device 80, or open-circuit failure of any individual pullup resistor, will not jeopardize the operation of the entire network.

Another possible pullup configuration is one where each device 80 has its own pullup resistors. This configuration does not require any of the devices 80 to be of a design different from that of any other devices 80, because all devices 80 have a pullup resistors. However, there is a limit to how many devices may be connected to the bus 86, because the pullup resistor on each device 80 increases the load which must be driven by the bus drivers 58, 60.

It is also possible for the system to operate if the provision of pullup resistors is neglected altogether. This embodiment is less preferred, because systems without pullup resistors tend to be slow and unreliable, and it is generally considered poor practice to neglect inclusion of pullup resistors.

The choice of the pullup configuration is a system design consideration which may be addressed by the configurations described above, or other configurations that will be apparent to one ordinarily skilled in the art. All such configurations are included in the scope of the present invention.

The above description applies to positive-logic embodiments of the present invention. It will be clear to those skilled in the art how to apply the principles of the present invention to other embodiments, for example to negative-logic embodiments of the present invention. All such embodiments are included in the scope of the present invention.

While the invention has been described with respect to a limited number of embodiments, it will be appreciated that many variations, modifications and other applications of the invention may be made.

What is claimed is:

1. A system for transmitting data, the system comprising:
   (a) at least one bus data line; and
   (b) at least one transmitter, each said transmitter including:
      (i) for each said at least one bus data line, a respective open-driver bus data line driver, each said open-driver bus data line driver drivingly connected to a corresponding said bus data line;
      (ii) at least one transmit data line for driving a respective said open-driver bus data line driver; and
      (iii) a collision-detection mechanism operative to detect a data difference between one of said at least one transmit data line and a corresponding said bus data line, and to set a collision signal upon detecting said data difference.

2. The system of claim 1, wherein said collision signal being set causes said open-driver bus data line driver to drive its respective said bus data line with data selected to cause any said transmitter that is transmitting data to said bus data lines to detect a collision.

3. The system of claim 1, wherein said collision signal being set causes said open-driver bus data line driver to drive its respective said bus data line to a low logic level.

4. The system of claim 1, further comprising:
   (c) a clock signal line,
operative to transmit a clock signal, said clock signal operative to restrict setting of said collision signal only according to data on said transmit data lines and said bus data lines during a predetermined range of times within a period of said clock signal.

5. The system of claim 1, further comprising:
(c) a data-sense signal line operative to conduct a data-sense signal.

6. The system of claim 5, wherein said data-sense signal has a driven state, and wherein each said transmitter-further includes:
(iv) an open-driver data-sense signal line driver operative to drive said data-sense signal line to said data-sense signal's driven state when said transmitter is transmitting data.

7. The system of claim 6, wherein said open-driver data-sense signal line drivers of said at least one transmitter are connected in a wired-and configuration.

8. The system of claim 5, further comprising:
(d) a conductor at a high logic level; and
(e) a resistor,
said resistor being connected between said conductor and said data-sense signal line.

9. The system of claim 5, wherein said data-sense signal has a default state, and wherein said transmitter further includes:
(iv) a latch operative, if said collision signal is set, to keep said collision signal set until said data-sense signal is in said default state thereof.

10. The system of claim 1, wherein said transmitter further includes:
(ii) a data-valid signal line,
operative to transmit a data-valid signal, each said open-driver bus data line driver of said transmitter being operative to be in a high-impedance state when said data-valid signal is in an inactive state and said collision signal is cleared.

11. A system for transmitting data, the system comprising:
(a) at least one bus data line; and
(b) at least one transmitter, each said transmitter including:
(i) for each said at least one bus data line, a respective open-driver bus data line driver, each said open-driver bus data line driver drivingly connected to a corresponding said bus data line; and
(ii) a data-valid signal line,
said data-valid signal line operative to transmit a data-valid signal, each said open-driver bus data line driver of said transmitter being operative to be in a high-impedance state when said data-valid signal is in an inactive state.

12. A system to connect a device to a bus, the device having a transmitter and a receiver, the bus having a plurality of bus data lines, the bus being operative to be connected to other transmitters and to other receivers, the system comprising:
(a) for each of the bus data lines, a respective open-driver bus data line driver suitable to be drivingly connected to said each bus data line;
(b) at least one transmit data line operative to accept data from the transmitter of the device and to drive a respective said open-driver bus data line driver; and
(c) a collision-detection mechanism operative to detect a data difference between one of said at least one transmit data line and the corresponding bus data line, and to set a collision signal upon detecting said data difference.

13. The system of claim 12, wherein said collision signal being set causes at least one of said plurality of open-driver bus data line drivers to drive its respective bus data line with data selected to cause any transmitter that is transmitting data to the bus data lines to detect a collision.

14. The system of claim 12, wherein said collision signal being set causes at least one of said plurality of open-driver bus data line drivers to drive its respective bus data line to a low logic level.

15. The system of claim 12, further comprising:
(d) a clock signal line,
operative to transmit a clock signal, said clock signal operative to restrict setting of said collision signal only according to data on said transmit data lines and the bus data lines during a predetermined range of times within a period of said clock signal.

16. The system of claim 12, further comprising:
(d) an open-driver data-sense signal line driver operative to drive a data-sense signal line of the bus to a driven state when the transmitter of the device is transmitting data.

17. The system of claim 12, further comprising:
(d) a conductor at a high logic level; and
(e) a resistor,
said resistor being connected between said conductor and said data-sense signal line.

18. The system of claim 12, further comprising:
(d) a latch operative, if said collision signal is set to keep said collision signal set until said data-sense signal line is in a default state.

19. The system of claim 12, further comprising:
(d) a data-valid signal line,
operative to accept a data-valid signal, each said open-driver bus data line driver of tile system being operative to be in a high-impedance state when said data-valid signal is in an inactive state and said collision signal is cleared.

20. A system to connect a device to a bus, the device having a transmitter and a receiver, the bus having a plurality of bus data lines, the bus being operative to be connected to other transmitters and to other receivers, the system comprising:
(a) for each of the bus data lines, a respective open-driver bus data line driver suitable to be drivingly connected to said each bus data line; and
(b) a clock signal line,
said clock signal line operative to transmit a clock signal to the transmitter of the device and to the receiver of the device, said clock signal operative to synchronize transmission of data by the transmitter to the bus data lines, and said clock signal operative to synchronize reception of data by the receiver from the bus data lines.

21. A system to connect a device to a bus, the device having a transmitter and a receiver, the bus having a plurality of bus data lines, the bus being operative to be connected to other transmitters and to other receivers, the system comprising:
(a) for each of the bus data lines, a respective open-driver bus data line driver suitable to be drivingly connected to said each bus data line;
(b) a gate; and
(c) a data-valid signal line, operative to accept a data-valid signal,
said gate operative to cause one said open-driver bus data line driver of the system to be in a high-impedance state when said data-valid signal is in an inactive state.

22. A method of transmitting data, via at least one bus data line, from a transmitter to a receiver, the transmitter having as many transmit data lines as there are bus data lines, comprising the steps of:

(a) providing an open-driver bus data line driver;
(b) transmitting data from the transmitter to the receiver via the transmit data line, said open-driver bus data line driver, and the bus data line; and
(c) monitoring the transmit data line and the bus data line for a data difference.

23. The method of claim 22, further comprising the step of:
(d) upon detection of said data difference, retransmitting the data.

24. The method of claim 22, further comprising the step of:
(d) upon detection of said data difference, transmitting data selected to cause any transmitter that is transmitting data to the bus data lines to detect a collision, until no transmitters connected to the bus data line are transmitting data.

25. The method of claim 22, further comprising the step of:
(d) upon detection of said data difference, transmitting a low logic level on the bus data line until no transmitters connected to the bus data line are transmitting data.

* * * * *